United States Patent [19]

Williams

[11] 4,149,425

[45] Apr. 17, 1979

[54] VARIABLE SPEED SHEAVE

[75] Inventor: William A. Williams, Philadelphia, Pa.

[73] Assignee: T. B. Wood's Sons Company, Chambersburg, Pa.

[21] Appl. No.: 703,664

[22] Filed: Jul. 8, 1976

Related U.S. Application Data

[63] Continuation of Ser. No. 510,173, Sep. 30, 1974, abandoned.

[51] Int. Cl.² ............ F16C 13/04; F16C 33/20; F16C 35/02; F16H 55/56
[52] U.S. Cl. .............. 74/230.17 C; 308/18; 308/238
[58] Field of Search .......... 33/147; 74/230.17 A, 74/230.17 B, 230.17 C, 230.3; 308/18, 121, 238

[56] References Cited

U.S. PATENT DOCUMENTS

| 2,952,161 | 9/1960 | Williams | 74/230.17 C |
| 2,992,844 | 7/1961 | Williams | 74/230.3 X |
| 3,122,384 | 2/1964 | Leunberger | 74/230.17 B |
| 3,142,907 | 8/1964 | Reef | 33/147 |
| 3,175,409 | 3/1965 | Macy | 74/230.17 A |
| 3,214,986 | 11/1965 | Anderson et al. | 74/230.17 C |
| 3,250,553 | 5/1966 | Detwiler | 74/230.17 C X |
| 3,270,578 | 9/1966 | Leadbeater | 74/230.17 C |
| 3,318,166 | 5/1967 | Anderson et al. | 74/230.17 C |
| 3,491,608 | 1/1970 | Trofimov | 74/230.17 C |
| 3,552,223 | 1/1971 | Glasson et al. | 308/238 |
| 3,802,285 | 4/1974 | Williams | 74/230.17 C |

Primary Examiner—Francis S. Husar
Assistant Examiner—Howard Beltran
Attorney, Agent, or Firm—B. P. Fishburne, Jr.

[57] ABSTRACT

A dual adjustable flange variable speed sheave employs a common sleeve with clamping end caps. Each flange applies pressure to a V-belt through a helical compression spring restrained by one of the end caps, the sheave being symmetrical about the center of the belt. Outboard bearings for the two adjustable flanges transmit their loadings to the end caps, and the flanges have inboard bearings directly engaged with the common sleeve or connected therewith through interdigitating bearing parts.

4 Claims, 7 Drawing Figures

VARIABLE SPEED SHEAVE

This is a continuation of application Ser. No. 510,173, filed Sept. 30, 1974, now abandoned.

BACKGROUND OF THE INVENTION

In the development of variable speed sheaves wherein both flanges are adjustable relative to a common sleeve component, several problems exist which seriously limit sheave design. In one form of variable speed sheave currently on the market, first and second adjustable flanges have their hubs telescoped with the interior of the two hubs bearing directly on the sleeve. As the pitch diameter of the sheave is changed, the hubs of the two flanges slide axially relative to each other and relative to the sleeve. This arrangement has several serious drawbacks, as follows:

(1) The minimum pitch diameter of the sheave cannot be as low as for a single adjustable flange sheave. This necessitates larger diameters to obtain the required speed change ratio and necessarily increases cost.

(2) Centering of the flanges becomes a costly problem. It is difficult to accomplish centering with two springs, because the bearing loads of one adjustable flange are greater than for the other flange, causing unequal drags as the pitch diameter of the sheave is changed, and causing the belt center line to shift. Mechanical centering devices to deal with this problem are known but all are quite costly and are often sources of fretting due to minute movements in the absence of lubrication.

(3) The sheave is more costly to produce because the two flange elements are non-identical. Furthermore, tight tolerances must be maintained between the annular hubs of the two flanges to guarantee proper flange concentricity.

In a second form of sheave commonly in use, the sheave is symmetrical about the belt center line allowing the use of common flanges, springs and end caps. However, the distance from the center line of belt pull to the bore end of the sheave must be minimized to satisfy motor bearing specifications. This requires short adjustable flange hub lengths and, therefore, high bearing stresses. These high bearing stresses, in turn, produce a high rate of wear of the bearing surfaces and relatively short sheave life.

If the bearing surfaces are not separated by lubricant, but instead are boundary (dry) lubricated bearings, it becomes extremely difficult to provide adequate sheave life when bearing pressures are high, i.e., 300–400 psi. If the bearing pressure can be reduced, bearing life can be markedly extended and the bearing cost is reduced.

The present invention has for its objective to improve upon the prior art pertaining to dual adjustable flange variable speed sheaves by providing a dry lubricated sheave with greatly reduced bearing pressures and several other unique features which will become apparent during the course of the following description.

BRIEF DESCRIPTION OF DRAWING FIGURES

DETAILED DESCRIPTION OF PREFERRED EMBODIMENTS

Figure 1:
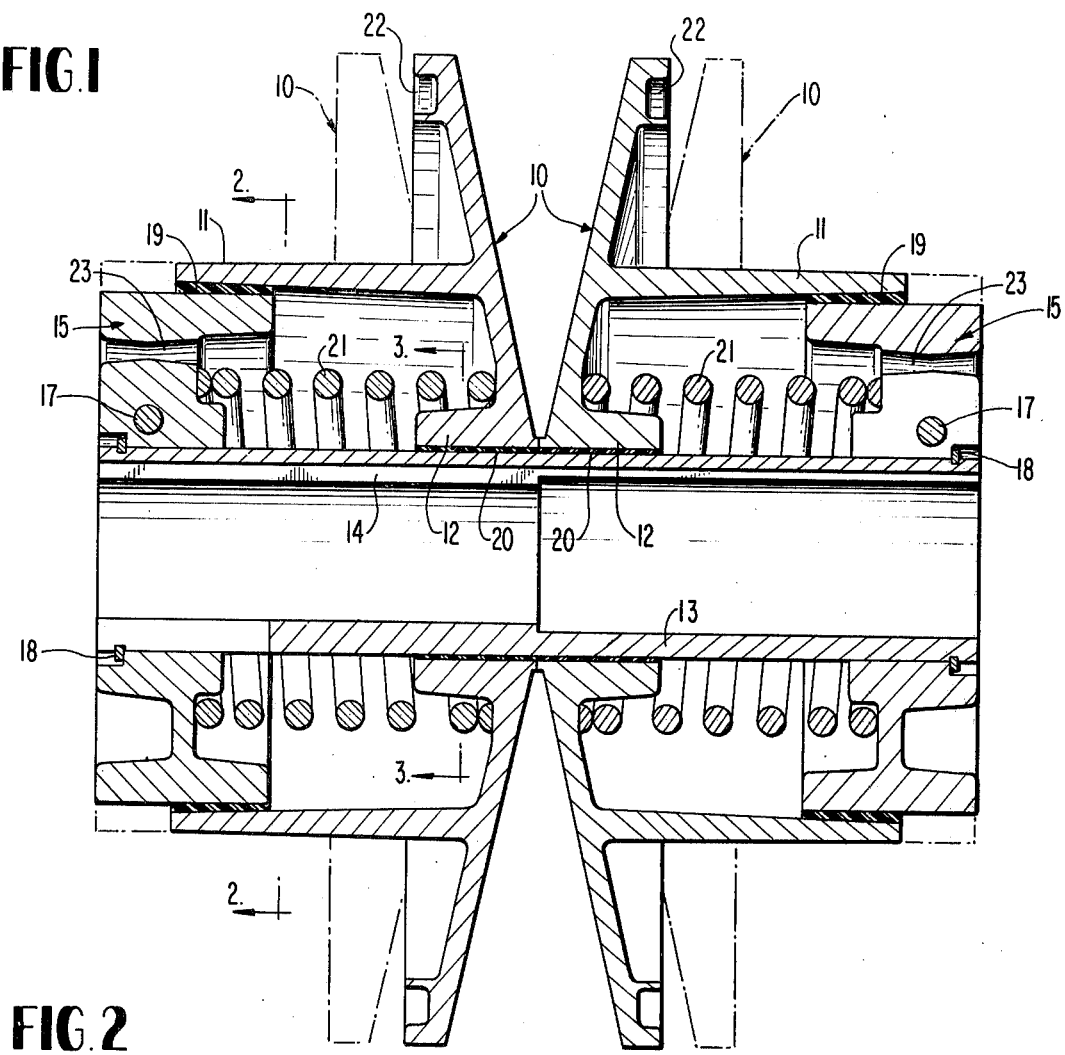
FIG. 1 is a central vertical section through a dual adjustable flange variable speed sheave according to one embodiment of the invention.

Referring to the drawings in detail wherein like numerals designate like parts, a dual adjustable flange variable speed sheave as shown in FIG. 1 is symmetrical with respect to the transmission belt center line and comprises opposing flanges 10 having outboard hubs 11 which are relatively long axially and concentric inboard hubs 12 which are relatively short axially and of considerably smaller diameter than the outboard hubs.

Figure 2:
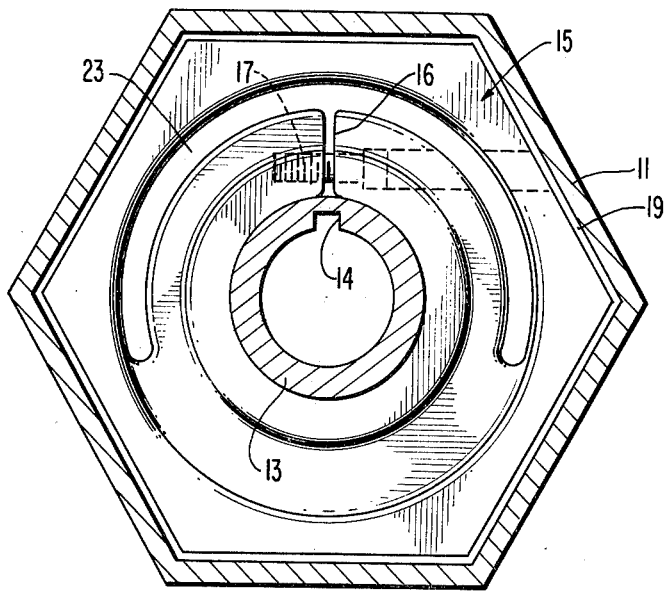
FIG. 2 is a transverse vertical section taken on line 2—2 of FIG. 1.
Figure 3:
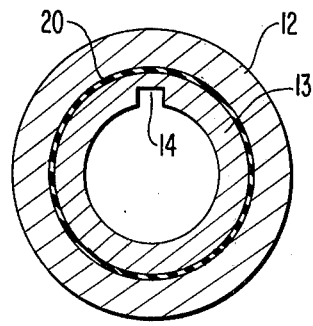
FIG. 3 is a similar section taken on line 3—3 of FIG. 1.

The sheave further comprises a sleeve 13 common to the two adjustable flanges 10 and having a longitudinal keyway 14 adapting it for attachment to a transmission shaft, not shown. The opposite ends of the common sleeve 13 carry end caps 15 of polygonal cross section, such as hexagonal. The end caps interfit with the outboard hubs 11 which are of the same cross sectional shape, FIG. 2, the inboard hubs 12 and sleeve 13 being annular, FIG. 3.

The end caps 15 are split radially at 16 and are clampingly secured to the sleeve 13 by clamping screws 17. The end caps are further retained on the sleeve by suitable retaining rings 18.

Outboard dry lube bearings 19 of any preferred form are held within the polygonal hubs 11 of adjustable flanges 10 and are slidably engaged over the end caps 15. Annular dry lube bearings 20 are similarly held within the inboard hubs 12 and are slidably engaged over the common sleeve 13.

The two adjustable flanges 10 are urged together in abutting relationship, FIG. 1, or into the condition of maximum belt pitch diameter by a pair of helical compression springs 21 retained by the end caps 15 in the manner shown in FIG. 1. Movement of the flanges 10 axially outwardly in response to increased belt tension is indicated by broken lines in FIG. 1. It will be noted that the sheave in FIG. 1 as thus far described is entirely symmetrical with respect to the belt center line.

In cases where the variable speed sheave is constructed in lightweight material, it is susceptible to residual imbalance caused by any small eccentricity of components, spring buckling or the like. The invention includes means to correct this imbalance and such means comprises a circumferentially extending groove or slot 22 in each adjustable flange 10 near its periphery and a circumferential slot 23 in each end cap 15. These grooves or slots are adapted to receive lead wire weights or the like of a prescribed cross section and length to correct and eliminate sheave imbalance. The grooves are located in the flanges and end caps to allow correcting sheave imbalance in four different planes. The lead wire weights are anchored in the grooves by staking, peening, or otherwise deforming the edge of the groove or the weight element as by pounding the same into the groove or slot.

In connection with the above-described sheave, it will be noted that the loading on the outboard bearings 19 caused by belt pressure is carried by the end caps 15 rather than by the sleeve 13 directly. This effectively increases the distance between the inboard and outboard bearings 20 and 19 without extending the overall length of the sheave, and more than doubles the diameter of the outboard bearings with a corresponding increase in bearing area. Since an analysis of forces acting on the adjustable flange 10 shows the pressure on the outboard bearings 19 to be greater than on the inboard bearings 20, this construction in FIG. 1 serves to reduce bearing pressure substantially, with a resulting increase in the life of the bearings and sheave.

The provision of the hexagonal outboard bearings 19 on both flanges 10 provides not only the desired bearing surfaces, but also provides a means of transmitting torque from the transmission shaft through the sleeve 13 and end caps 15 to each adjustable flange 10 and to the V-belt.

Another embodiment of the invention depicted by FIGS. 4 through 7 effectively increases the axial distance between each outboard bearing 24 of the illustrated sheave and the opposite inboard dry lube bearing 25. As a result of nearly doubling this distance in comparison to other designs, bearing pressure is reduced four times and the useful life of the dry lube bearings is substantially increased.

Figure 4:
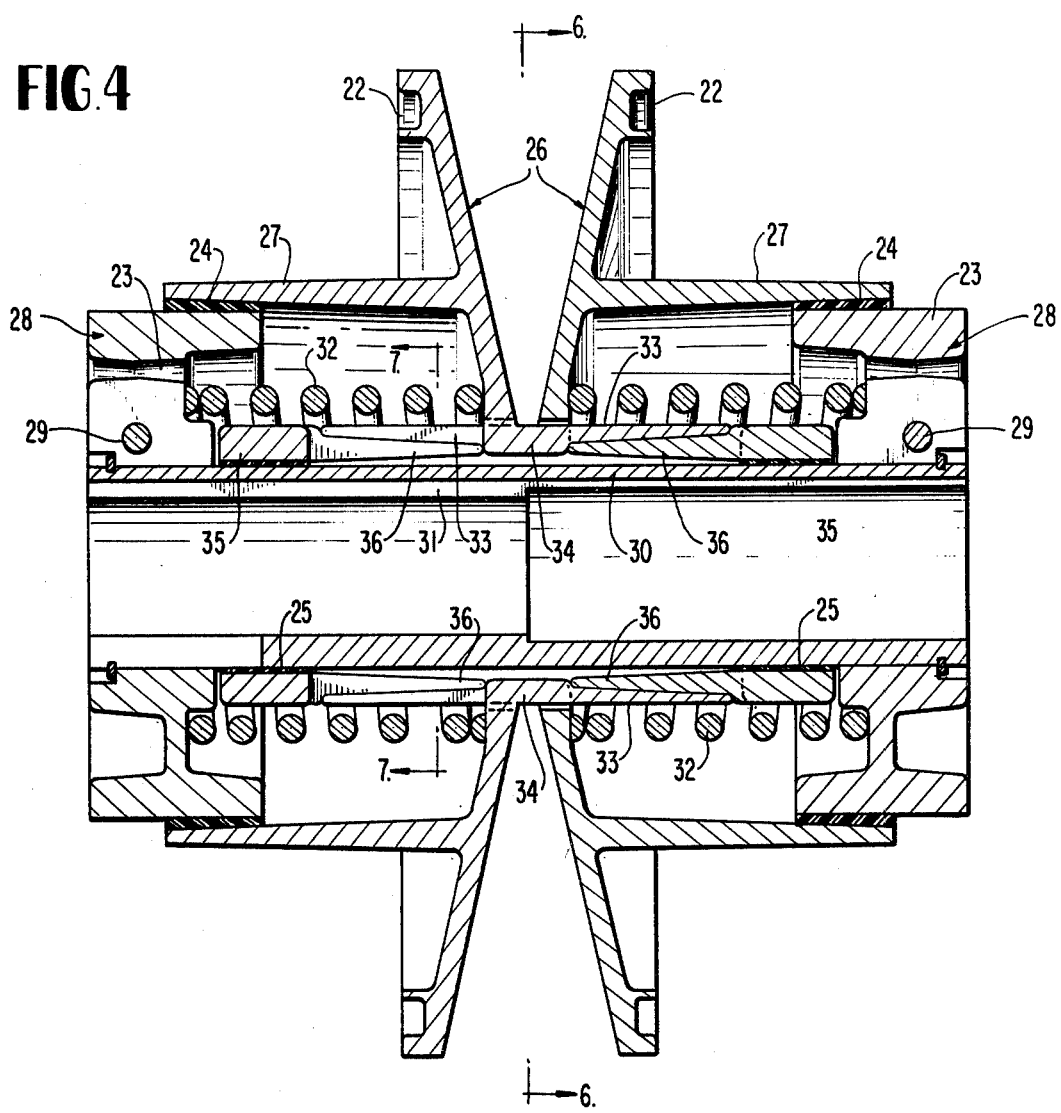
FIG. 4 is a central vertical longitudinal section taken through a sheave embodying a modification of the invention.
Figure 7:
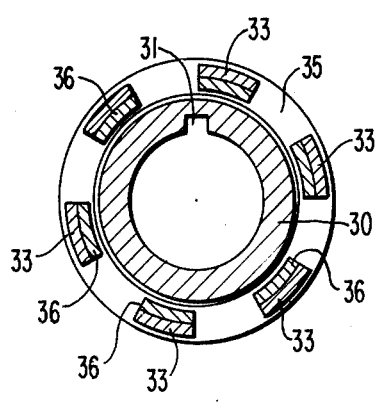
FIG. 7 is a similar section taken on line 7—7 of FIG. 4.

Referring to FIGS. 4 and 7, a pair of adjustable sheave flanges 26 having outboard hubs 27 fitted with the dry lube bearings 24 are telescoped over clamping end caps 28 which may be identical to the previously-described caps 15. The end caps 28 are securely clamped at 29 to a common sleeve 30 for the sheave having a keyway 31 for keying it to a transmission shaft, not shown. Compression springs 32, identical to the springs 21, are provided and bear on the adjustable flanges 26, urging them together. As in the prior embodiment, the sheave is symmetrical about the center line of the transmission belt, not shown.

Figure 5:
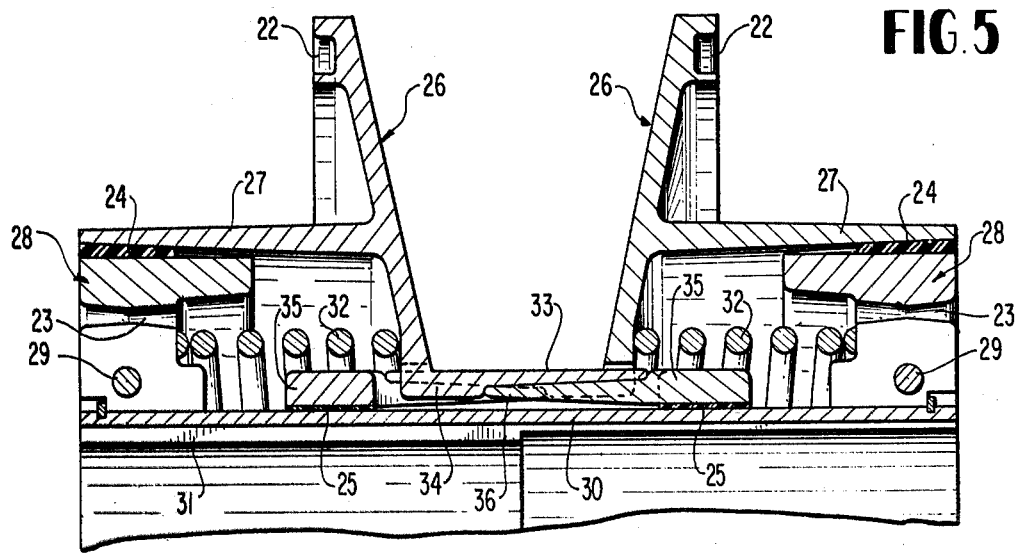
FIG. 5 is a similar view showing the two adjustable flanges of the sheave separated for reducing the pitch diameter of the belt, not shown.
Figure 6:
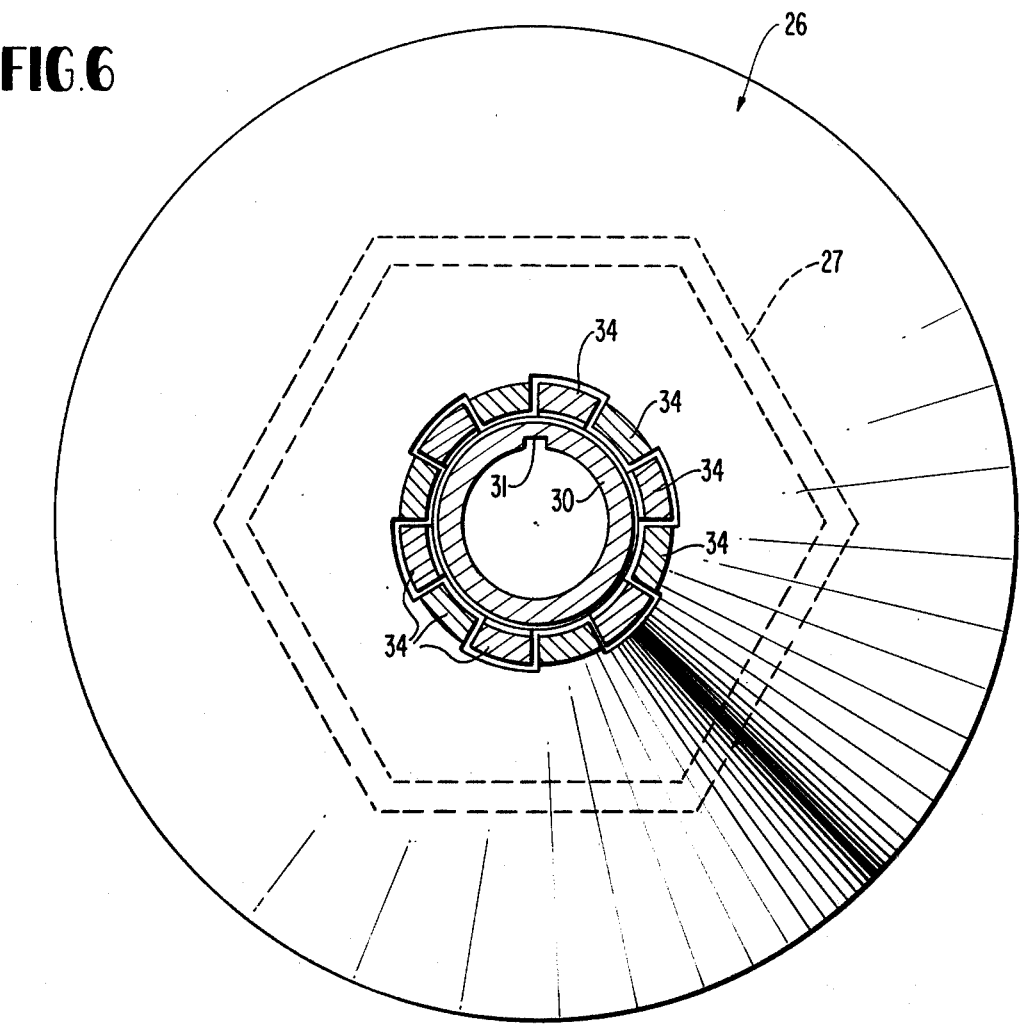
FIG. 6 is a transverse vertical section taken on line 6—6 of FIG. 4.

In the arrangement shown in FIGS. 4 to 7, portions of each flange 26 are caused to extend over the center of symmetry. This is accomplished by interdigitating the two adjustable flanges; more particularly, by extending a series of axial prongs 33 on each flange 26 through the adjacent flange in circumferential interfitting relationship, as best shown in FIG. 6. As shown in FIG. 4, these prongs 33 are reduced in thickness toward their tips compared to their root portions 34 where they are joined to the flanges 26. The root portions 34 of the two adjustable flanges are also interdigitated, as shown.

In conjunction with the oppositely extending interdigitated prongs 33 of the two flanges, separately formed bearing rings 35 or interior hubs are provided on the common sleeve 30 and these bearing rings carrry the previously-noted inboard dry lube bearings 25 which slidably contact the sleeve 30. The bearing rings 35 carry axially inwardly extending prongs 36 which underlie or interfit with the prongs 33 and are rigidly secured thereto with epoxy resin when the parts are preassembled. Consequently, referring to FIGS. 4 and 5, the left hand adjustable flange 26 through its prongs 33 is joined to the bearing ring 35 which lies on the rearward side of the opposing flange 26, while the prongs 33 of the right hand flange 26 are joined to the left hand bearing ring 35 which lies rearwardly of the first-mentioned flange 26. The mating pairs of prongs 33 and 36 are joined at points of inflection or where there is little or no bending stress on either prong. This insures a long-lasting connection free of possible bond failure due to bending fatigue.

Full circle bearing rings 35 or interior hubs are employed to provide maximum bearing area and minimum bearing pressure. It is also possible to place segmented bearing elements under each prong in contact with the sleeve 30 in lieu of the illustrated arrangement. However, the full circle bearing rings 35 are preferred. It should also be emphasized that the use of the end caps 28 for the support of the outboard bearings 24 is really the feature that makes the total construction shown in FIG. 4 possible and practical. In the illustrated arrangement, the two adjustable flanges 26 are interdigitated as a means of increasing bearing support length axially of the sleeve 30 and reducing bearing pressure. The identical means for correcting imbalance of the variable speed sheave described in the prior embodiment is also utilized in the embodiment shown by FIGS. 4 to 7 and need not be repeated in detail.

Finally, it should be noted that the end caps 28 play several key roles in the invention, namely, outboard bearing supports for the adjustable flanges, restrainers and locators for the compression springs, means for correcting residual imbalance of the assembly, and a clamping means for assembling with the sleeve 30 or 13.

FIGS. 4 and 5 further illustrate the axial movements of flanges 26 with their interdigitated components and connected inboard bearing rings 35 relative to the sleeve 30. It will be noted that, as the belt engaging flanges separate axially, the inboard bearings 25 move together in comparison to their fully separated positions in FIG. 4 where they are more nearly aligned radially with the outboard dry lube bearings 24. The shifting arrangement is ideal in minimizing stress and bearing pressure throughout the sheave assembly under all conditions of belt adjustment and tension.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A variable speed completely dry lube sheave comprising a sleeve element adapted for mounting on a rotary transmission shaft to turn therewith, a pair of enlarged radially divided end caps each having at least one polygonal exterior surface portion mounted on opposite end portions of the sleeve element in axially spaced relationship, a fastener means carried by each end cap and bridging the radial division thereof and clampingly locking the end cap to the sleeve fixedly, a pair of opposing axially movable flange element on said sleeve element, compression springs surrounding the sleeve element between said end caps and generally radial walls of the flange elements and yieldingly urging the flange elements toward each other axially, multiple interdigitating axially oppositely extending prongs on the flange elements lying close to the exterior surface of the sleeve element, interior continuous annular hubs secured to the axially outermost ends of the prongs of said flange elements most distant from the respective interior hubs, said interior hubs closely surrounding the sleeve element substantially in common circumferential planes with said interdigitating prongs, exterior continuous hubs on the flange elements projecting axially outwardly in opposite directions from said generally radial walls of the flange elements and telescopically engaging over said enlarged end caps, said continuous exterior hubs having the same cross sectional shapes as the exterior surfaces of the end caps to facilitate mating therewith telescopically, the interdigitating prongs and interior hubs lying radially inwardly of said compression springs and the exterior hubs lying radially outwardly of said springs, a pair of continuous interior dry lube bearings within the bores of said interior hubs and slidably engaging said sleeve element at two widely axially spaced regions thereon, and a pair of continuous exterior dry lube bearings within the exterior hubs and slidably engaging the exteriors of the enlarged end caps at a pair of regions which are spaced substantial distances from the interior dry lube bearings both radially and axially.

2. A symmetrical variable speed sheave comprising a sleeve element adapted for mounting on a rotary shaft to turn therewith, a pair of enlarged end caps fixedly secured to the sleeve element in axially spaced relation near the ends of the sleeve element, a pair of axially opposing and axially adjustable flanges on the sleeve element and turning therewith, said flanges having first relatively small inboard dry lube bearings slidably engaged with the sleeve element and having second relatively large outboard dry lube bearings slidably engaged telescopically with said enlarged end caps, said inboard and outboard dry lube bearings of each flange being radially and axially spaced and concentrically arranged, and means on the sheave to correct residual imbalance therein including a weight receiving cavity in at least one flange of the sheave.

3. A symmetrical variable speed sheave comprising a sleeve element adapted for mounting on a rotary shaft to turn therewith, a pair of enlarged end caps fixedly secured to the sleeve element in axially spaced relation near the ends of the sleeve element, a pair of axially opposing and axially adjustable flanges on the sleeve element and turning therewith, said flanges having first relatively small inboard dry lube bearings slidably engaged with the sleeve element and having second relatively large outboard dry lube bearings slidably engaged telescopically with said enlarged end caps, said inboard and outboard dry lube bearings of each flange being radially and axially spaced and concentrically arranged, and said end caps being radially divided, and means engaged with the divided end caps and operable to circumferentially draw the end caps securely into clamping engagement with said sleeve element.

4. A symmetrical variable speed sheave comprising a sleeve element adapted for mounting on a rotary shaft to turn with the shaft, a pair of enlarged end caps fixedly mounted on opposite end portions of the sleeve element in axially spaced relation, a pair of axially opposed and axially adjustable flanges on the sleeve element and connected with the sleeve element in such a way that the flanges must rotate with the sleeve element, circumferentially continuous relatively small inboard dry lube bearings for the flanges slidably engaging the sleeve element, relatively large outboard dry lube bearings for the flanges slidably engaging the exterior faces of said end caps and extending continuously around the end caps, said inboard and outboard dry lube bearings of each flange being radially and axially spaced and concentrically arranged, said inboard bearings of the flanges having a pair of dry lube ring bearings, and interdigitating prongs on said flanges and ring bearings extending in opposite directions axially of the sheave with corresponding prongs on the flanges and ring bearings joined, whereby each ring bearing moves axially of said sleeve element with the flange which is most remote therefrom on the sleeve element.

* * * * *